(12) United States Patent
Niwa et al.

(10) Patent No.: US 8,590,306 B2
(45) Date of Patent: Nov. 26, 2013

(54) COOLING DEVICE OF TURBOCHARGER OF ENGINE FOR VEHICLE

(75) Inventors: Yasushi Niwa, Hiroshima (JP); Kazuaki Nishimura, Hiroshima (JP); Satoshi Nishizaka, Hiroshima (JP); Hiroaki Deguchi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 335 days.

(21) Appl. No.: 13/168,746

(22) Filed: Jun. 24, 2011

(65) Prior Publication Data

US 2012/0003082 A1    Jan. 5, 2012

(30) Foreign Application Priority Data

Jun. 30, 2010  (JP) ................. 2010-149947

(51) Int. Cl.
| | |
|---|---|
| F02B 33/44 | (2006.01) |
| F02B 29/04 | (2006.01) |
| F01P 1/06 | (2006.01) |
| F01P 7/14 | (2006.01) |
| F01P 3/00 | (2006.01) |
| F01P 11/02 | (2006.01) |
| F02F 1/10 | (2006.01) |
| F02F 1/36 | (2006.01) |
| F02F 1/40 | (2006.01) |

(52) U.S. Cl.
USPC .............. 60/605.3; 60/599; 60/612; 123/562; 123/41.31; 123/41.1; 123/41.14; 123/41.17; 123/41.43; 123/41.72; 123/41.82 R

(58) Field of Classification Search
USPC ............. 60/605.3, 612, 599; 123/41.31, 41.1, 123/41.14, 41.17, 41.23, 41.24, 41.25, 123/41.26, 41.29, 41.43, 41.49, 41.72, 123/41.82 R See application file for complete search history.

(56) References Cited

U.S. PATENT DOCUMENTS

| | | | | |
|---|---|---|---|---|
| 1,985,240 | A | * | 12/1934 | Brubaker ................... 123/41.29 |
| 3,827,236 | A | * | 8/1974 | Rust ............................. 60/605.3 |
| 4,061,187 | A | * | 12/1977 | Rajasekaran et al. ...... 123/41.31 |
| 4,107,927 | A | * | 8/1978 | Gordon et al. ................ 417/407 |
| 4,207,848 | A | * | 6/1980 | Dinger et al. .................. 60/599 |
| 4,520,767 | A | * | 6/1985 | Roettgen et al. ........... 123/41.31 |
| 4,561,387 | A | * | 12/1985 | Korkemeier et al. ...... 123/41.31 |
| 4,608,827 | A | * | 9/1986 | Hasegawa et al. ......... 123/41.31 |

(Continued)

FOREIGN PATENT DOCUMENTS

| | | | | |
|---|---|---|---|---|
| JP | 60090923 | A | * | 5/1985 |
| JP | 60122229 | A | * | 6/1985 |

(Continued)

*Primary Examiner* — Thai Ba Trieu
(74) *Attorney, Agent, or Firm* — Studebaker & Brackett PC

(57) ABSTRACT

There are provided first and second water supply passages to supply cooling water from an engine to first and second center housings of first and second turbochargers, and first and second return passages to return the cooling water from the first and second turbochargers to the engine. A cooling-water connection portion of the first water supply is located above the level of a cooling-water connection portion of the second water supply passage. A vapor releasing passage is provided between the second turbocharger and an upper tank provided on the outside of an engine body at a position located above the connection portion of the second return passage of the second turbocharger. Accordingly, the function of vapor releasing from the first and second turbochargers can be improved, thereby increasing the layout flexibility around the engine.

11 Claims, 15 Drawing Sheets

(56) References Cited

U.S. PATENT DOCUMENTS

| | | | |
|---|---|---|---|
| 4,829,939 A * | 5/1989 | Veenemans et al. | 123/41.31 |
| 4,885,911 A * | 12/1989 | Woollenweber et al. | 123/41.49 |
| 4,918,923 A * | 4/1990 | Woollenweber et al. | 60/599 |
| 4,928,637 A * | 5/1990 | Naitoh et al. | 123/41.31 |
| 4,958,600 A * | 9/1990 | Janthur | 123/41.31 |
| 5,275,133 A * | 1/1994 | Sasaki et al. | 123/41.31 |
| 6,213,062 B1 * | 4/2001 | Kawase | 123/41.31 |
| 6,513,328 B2 * | 2/2003 | Baeuerle et al. | 60/599 |
| 8,365,526 B2 * | 2/2013 | Stiermann | 60/599 |

FOREIGN PATENT DOCUMENTS

| | | | |
|---|---|---|---|
| JP | 62294724 A * | 12/1987 | |
| JP | 2006-070878 A | 3/2006 | |
| JP | 2008019711 A * | 1/2008 | |
| JP | 2008-031865 A | 2/2008 | |

\* cited by examiner

|  | Start (M0) | Low (M1) | Middle (M2) | M. High (M3) | High (M4) |
|---|---|---|---|---|---|
| Reg. V. | Open | Close | Adjust | Open | Open |
| Intake Cut V. | Close | Close | Close | Open | Open |
| Waste Gate V. | Open | Close | Close | Close | Adjust |

COOLING DEVICE OF TURBOCHARGER OF ENGINE FOR VEHICLE

BACKGROUND OF THE INVENTION

The present invention relates to a cooling device of a turbocharger of an engine for a vehicle, and in particular relates to the one in which a first turbocharger and a second turbocharger are provided at a one-side wall of the engine, the second turbocharger being located above the level of the first turbocharger.

Conventionally, a turbo charging device to supercharge intake air by using the kinetic energy of exhaust gas exhausted from an engine is known. Further, a sequential type of turbo charging device, in which there are provided a small-sized turbocharger to supercharge the intake air mainly at a low engine-speed and low load and a large-sized turbocharger to supercharge the intake air mainly at a high engine-speed and high engine-load, and supercharging characteristics of the turbochargers are selectable in accordance with an engine's operation state, is known.

In the turbo charging device disclosed in US Patent Application Publication No. 2003/150408, the large-volume first turbocharger and the small-volume second turbocharger are provided at the one-side wall of the engine, the second turbocharger being located above the level of the first turbocharger, the compressor of the second turbocharger being arranged downstream of the compressor of the first turbocharger, and the intercooler is arranged upstream of the coolant's cooler and between the compressor of the first turbocharger and the compressor of the second turbocharger. According to this device, the length of the intake-air pipe between the intercooler and the compressor of the second turbocharger can be shorter, so that the layout space can be improved.

In the turbo charging device disclosed in Japanese Patent Laid-Open Publication No. 2006-70878, the small-sized turbocharger, the large-sized turbocharger, the DPF (Diesel Particulate Filter) connected to the turbine outlet of the large-sized turbocharger are provided at the one-side wall of the engine, the large-sized turbocharger being arranged below the small-sized turbocharger, the DPF being located below the small-sized turbocharger and substantially at the level of the large-sized turbocharger so that the exhaust-gas induction port thereof opens on the side of the turbine of the large-sized turbocharger. According to this device, the DPF and turbochargers can be provided compactly on the one-side wall of the engine, and the exhaust gas with less exhaust-energy loss and higher temperature can be obtained.

The turbine shaft of the turbo charging device is rotatably supported at the oil-lubrication type of the shaft bearing portion in the center housing. Herein, the turbine driven by the exhaust-gas kinetic energy rotates at a high engine-speed exceeding 200,000 rpm, so the shaft bearing portion receives a high thermal load and therefore it is cooled with the cooling water circulating the center housing. An operation of a water pump to force the cooling water to circulate is stopped concurrently with a stop of the engine. Therefore, when the engine stops after the engine operation at a high engine load, the cooling water comes to a boil and the vapor of the cooling water generates in the center housing, so that the temperature of the center housing including the shaft bearing portion increases promptly, which may cause a heat damage of the shaft bearing portion or deterioration of the lubricating oil. Accordingly, the vapor inside the center housing is generally released to a cooling-water storage portion provided on the outside of the engine body, for example, a radiator or the like.

In the turbo charging device disclosed in Japanese Patent Laid-Open Publication No. 2003-239752, there are provided the turbocharger provided at the front side wall of the engine, the first cooling-water passage as a vapor releasing passage to connect the upper tank of the radiator and the turbocharger, the second cooling-water passage to connect the turbocharger and the heater return passage provided on the suction side of the water pump, and so on. Thereby, when the engine stops after the engine operation at the high load or the like, the vapor generating in the center housing flows into the upper tank through the first cooling-water passage and the same amount of cooling water as the cooling water flowing into the upper tank is newly supplied from the second cooling-water passage.

According to the turbo charging device disclosed in the above-described third patent publication, the vapor can be discharged effectively from the inside of the center housing by using the cooling-water passage. However, in the case of providing the two turbochargers at the side wall of the engine as disclosed in the above-described first and second patent publications, the following new problems may occur.

First, it is necessary that the difference in the level between the center housing and the flowing-out position (the connection portion) of the vapor releasing passage is set at a specified height or greater in order to secure the vapor releasing function of the respective turbochargers. However, in case there is a level difference between the connection portions of the respective vapor releasing passages provided at the identical cooling-water storage portion, the vapor flowing out from the connection portion of the vapor releasing passage provided at the lower position flows in from the connection portion of the vapor releasing passage provided at the higher position. As a result, the flowing-out of the vapor from the connection portion provided at the higher position may be obstructed.

Secondly, since the two turbochargers are provided at the engine side wall, in addition to a connection passage for exhaust interconnecting the two turbochargers, a housing, oil supply and return passages, cooling-water supply and return passages and the like are necessary for each of the turbochargers, so that the layout around the engine becomes difficult. Further, in case the exhaust manifold of the engine is positioned on the vehicle rear side, that is—a so-called engine rear exhaust, the length of the cooling-water passages becomes longer compared to a so-called engine front exhaust as disclosed in the third patent publication, and there is a concern that the layout may deteriorate.

SUMMARY OF THE INVENTION

An object of the present invention is to provide a cooling device of a turbocharger of an engine for a vehicle which can improve the vapor releasing function from the first and second turbochargers or increase the layout flexibility around the engine.

According to the present invention, there is provided a cooling device of a turbocharger of an engine for a vehicle, in which a first turbocharger and a second turbocharger are provided at a one-side wall of the engine, the second turbocharger being located above the level of the first turbocharger, comprising first and second water supply passages to supply cooling water from the engine to respective shaft bearing portions of the first and second turbochargers, first and second return passages to return the cooling water from the first and second turbochargers to the engine, respective connection portions of the first and second water supply passages to an engine body of the engine, the connection portion of the first water supply passage being located above the level of the connection portion of the second water supply passage, and a vapor releasing passage provided between the second turbocharger and a cooling-water storage portion which is provided on the outside of the engine body at a position located above a connection portion of the second return passage of the second turbocharger.

According to the cooling device of a turbocharger of an engine for a vehicle of the present invention, since the vapor releasing passage is provided between the second turbocharger and the cooling-water storage portion which is provided on the outside of the engine body at the position located above the connection portion of the second return passage of the second turbocharger, the vapor of the second turbocharger can be released smoothly from the vapor releasing passage without flowing into the second return passage. Accordingly, since the vapor from the first turbocharger is released to the engine-body side and the vapor from the second turbocharger is released to the cooling-water storage portion provided on the outside of the engine body, the vapor flowing out from one of the turbochargers does not obstruct the vapor flowing out from the other of the turbochargers, so that the vapor releasing function from the first and second turbochargers can be improved. Moreover, the level difference between the first turbocharger and the engine-body-side connection portion and the level difference between the second turbocharger and the cooling-water storage portion can be secured regardless of the arrangement positions of the first and second turbochargers, so that the vapor releasing function can be improved. Since any vapor releasing passage connecting the first turbocharger and the cooling-water storage portion provided on the outside of the engine body can be omitted, the layout flexibility around the engine can be increased.

According to an embodiment of the present invention, the first and second return passages are provided at positions located below the first and second turbochargers. Thereby, as well as the layout flexibility of the first and second return passages can be increased, the vapor from the first turbocharger can be released securely to the engine-body side, and the vapor from the second turbocharger can be released to the cooling-water storage portion provided on the outside of the engine body.

According to another embodiment of the present invention, a flexible hose is provided at the second return passage. Thereby, the assembly error and the vibration move of the second turbocharger relative to the engine can be absorbed easily.

According to another embodiment of the present invention, the first and second retune passages are connected to a suction-side portion of a water pump provided at the engine body. Thereby, the cooling water can be compulsorily circulated with a suction force of the water pump, so that the return function can be improved.

According to another embodiment of the present invention, the cooling-water storage portion is an upper tank of a radiator. Thereby, the level difference and pressure difference can be secured to the second turbocharger, so that the vapor releasing function can be improved.

Other features, aspects, and advantages of the present invention will become apparent from the following description which refers to the accompanying drawings.

DETAILED DESCRIPTION OF THE INVENTION

Hereafter, a preferred embodiment of the present invention will be described. In the embodiment the direction is described so that the "front" or "rear" means the vehicle front or the vehicle rear and the "right" or "left" means the right or left when viewed from the vehicle rear.

Figure 1:
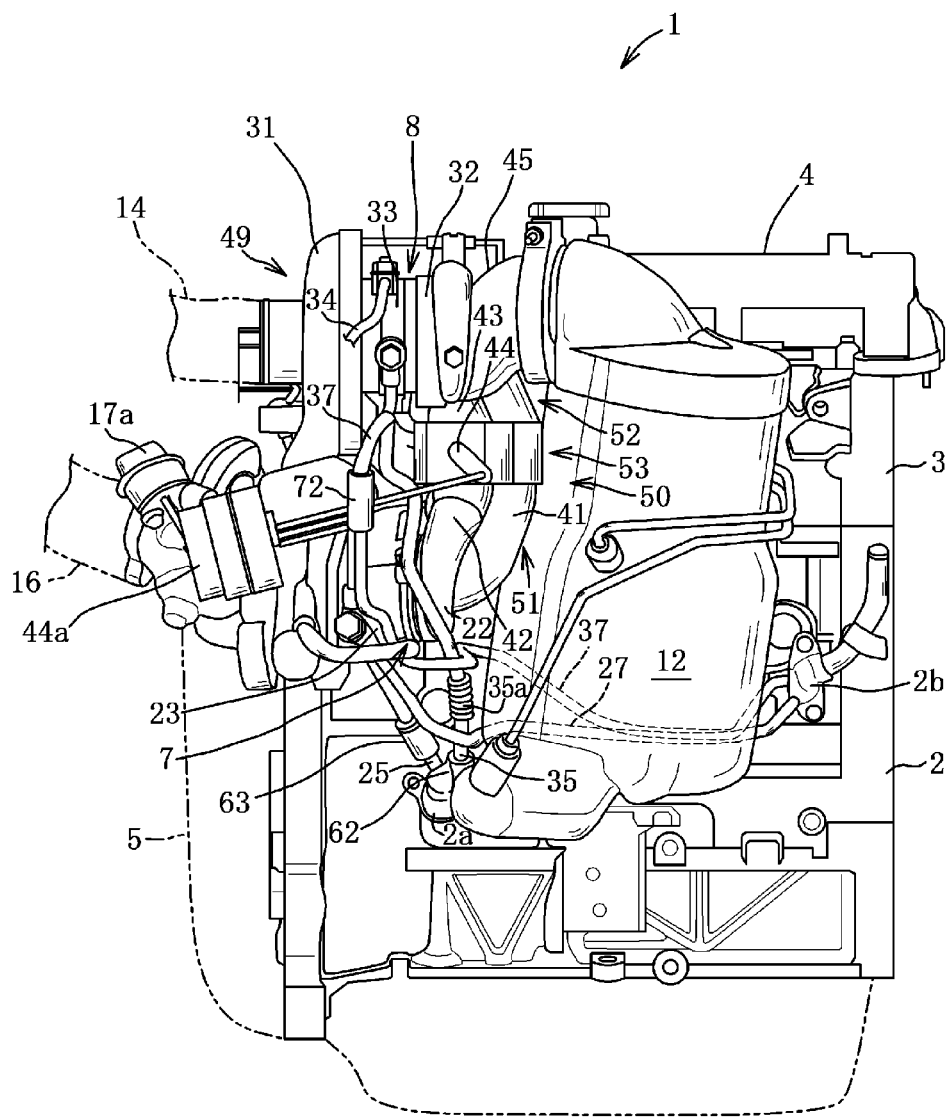
FIG. 1 is a rear view of a turbo charging device of an engine for a vehicle according to the present invention, when viewed from a vehicle rear.
Figure 2:
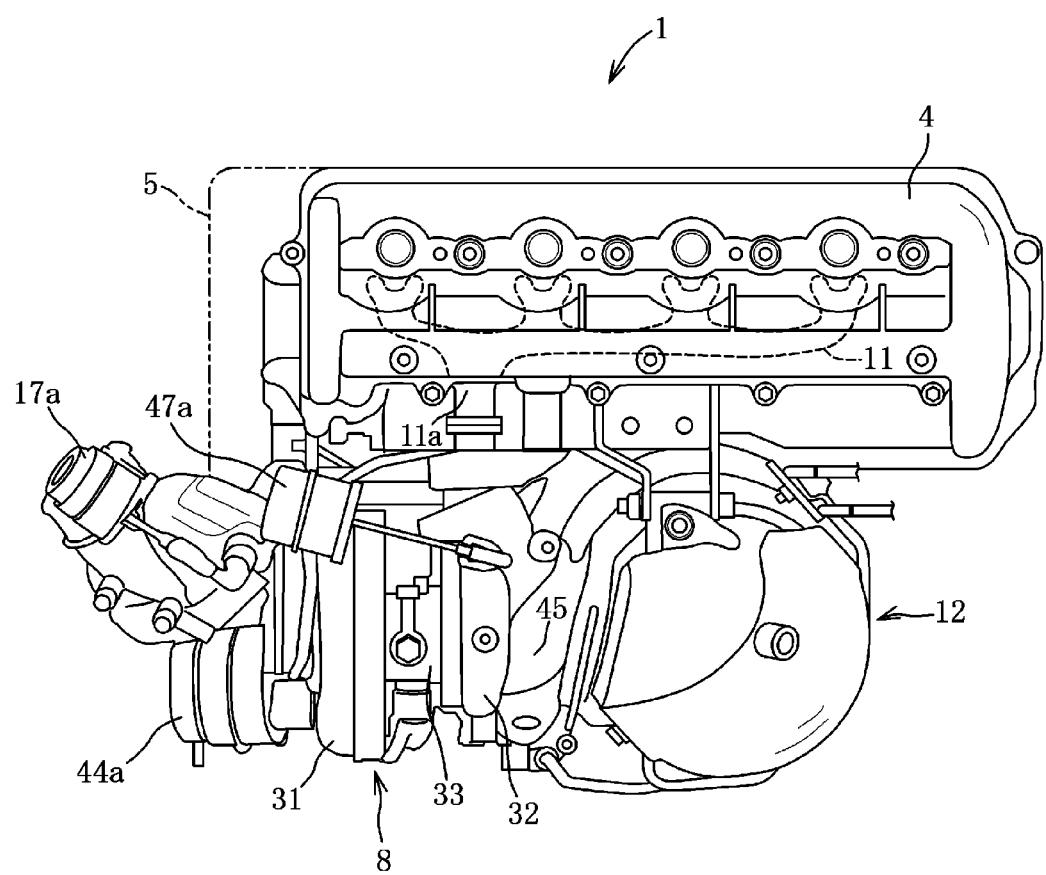
FIG. 2 is a plan view of the engine, when viewed from above.
Figure 3:
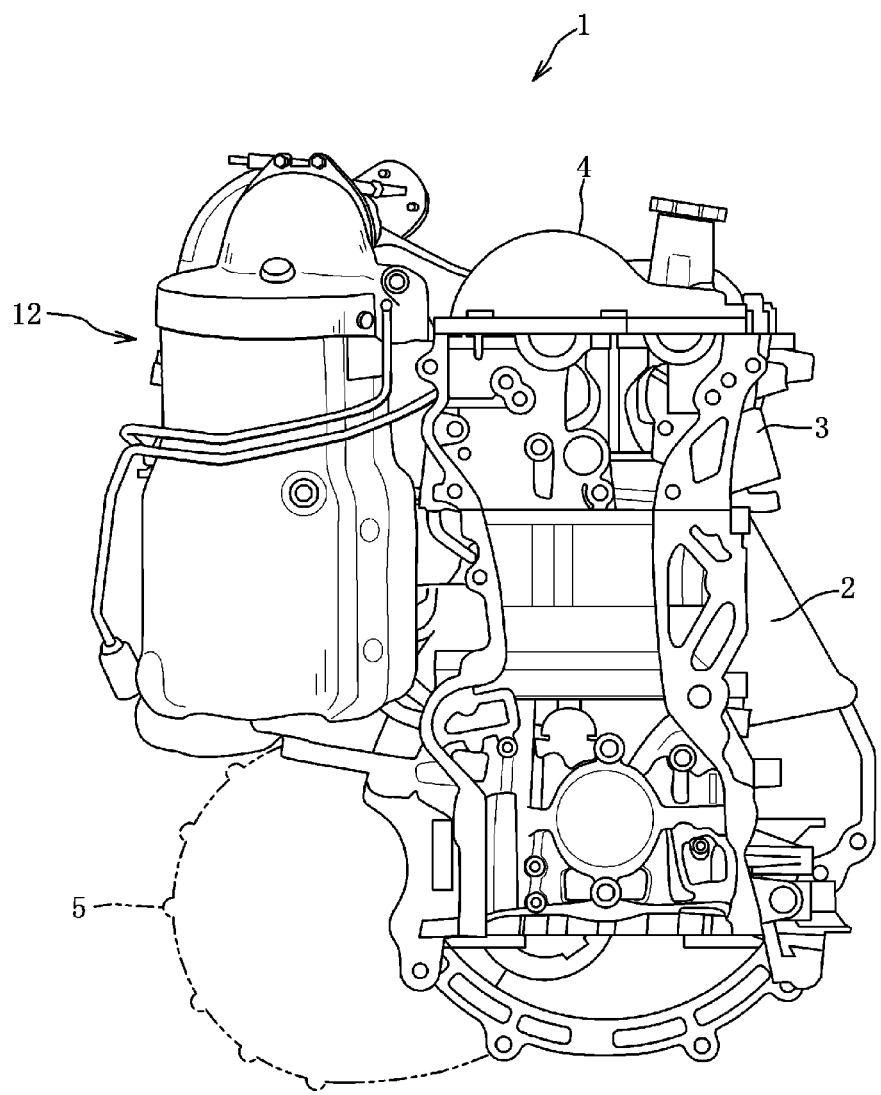
FIG. 3 is a right side view of the engine.

The present embodiment of the present invention will be described referring to FIGS. 1 through 18. As shown in FIGS. 1 through 3, an inline 4-cylinder diesel engine 1 comprises a cylinder block 2, a cylinder head 3 which is arranged above the cylinder block 2, a cylinder head cover 4 which covers over the cylinder head, a transmission unit 5 which is arranged at a left-side end portion of the cylinder block 2, and so on.

The engine 1 is disposed laterally so that the direction of its crankshaft (not illustrated) matches the direction of a vehicle axle, and intake ports 3a are positioned on the vehicle front side and exhaust ports 3b are positioned on the vehicle rear side. The engine 1 is configured so that its compression ratio in the compression stroke is controlled at around 14, for example, which may be smaller than that of a normal diesel engine. The transmission unit 5 includes a transfer case (not illustrated) covering the unit, which projects rearward from the rear side wall of the engine 1.

As shown in FIGS. 1 through 3 and 9, an intake system of the engine 1 comprises an air cleaner 6 which removes (traps) dusts and the like in the intake air, a first turbocharger compressor 7a of a small-volume first turbocharger 7 which supercharges the intake air mainly at a low engine-speed, a second turbocharger compressor 8a of a large-volume second turbocharger 8 which supercharges the intake air mainly at a middle and high engine-speed, an intercooler 9 which cools the intake air heated through pressing, an intake manifold 10 which guides the intake air to the intake ports 3a of the engine, and so on.

Figure 4:
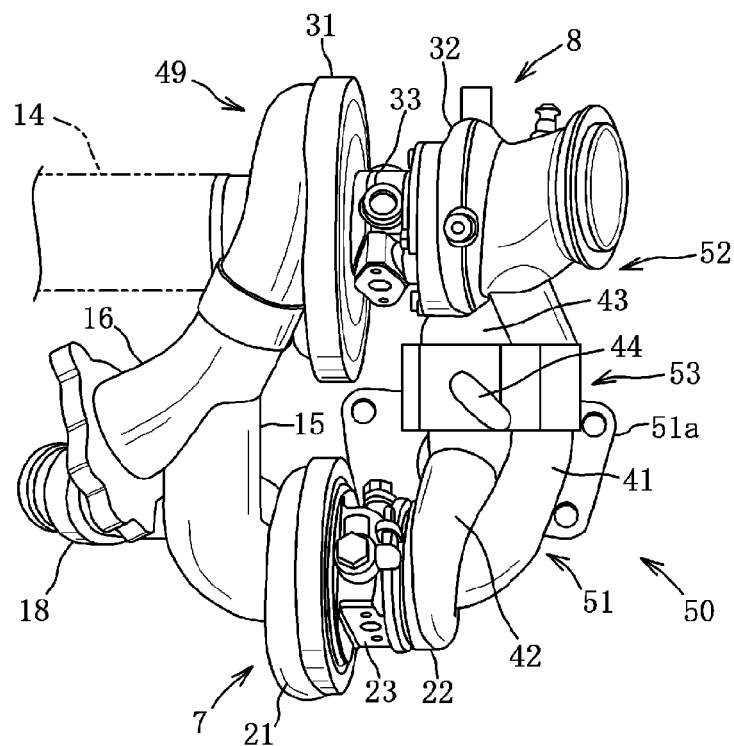
FIG. 4 is a rear view of an intake passage unit and an exhaust passage unit, when viewed from the vehicle rear.
Figure 9:
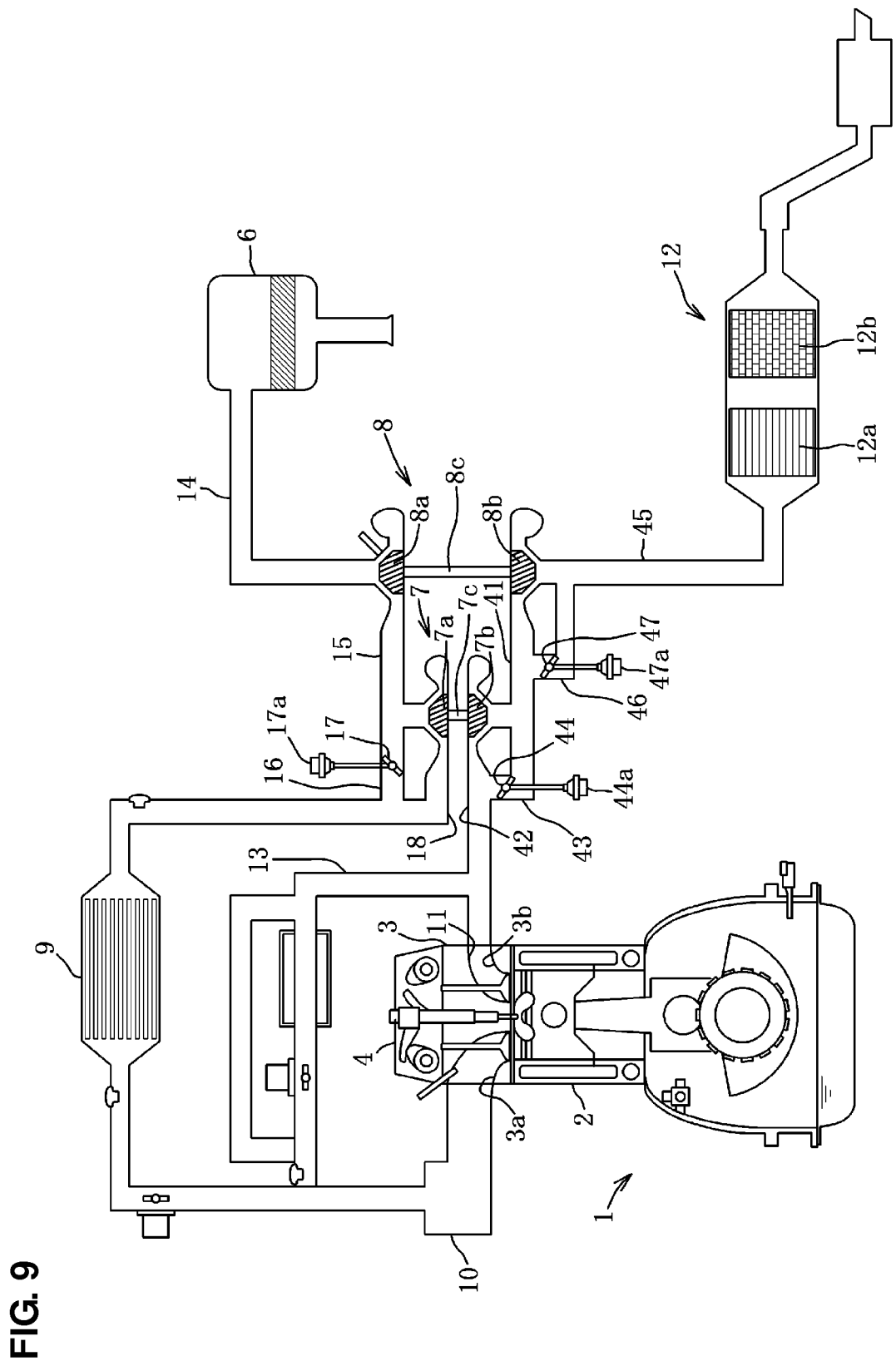
FIG. 9 is a diagram schematically showing intake and exhaust flows.

As shown in FIGS. 4 and 9, the first turbocharger 7 comprises the first turbocharger compressor 7a, a first turbocharger turbine 7b, a first turbocharger turbine shaft 7c which synchronously-rotatably connects the first turbocharger compressor 7a and the first turbocharger turbine 7b, a first compressor housing 21 which covers an outer periphery of the first turbocharger compressor 7a, a first turbine housing 22 which covers an outer periphery of the first turbocharger turbine 7b, a first center housing 23 (shaft bearing portion) which rotatably supports the first turbocharger turbine shaft 7a and covers an outer periphery of the first turbocharger turbine shaft 7c, and so on. The first center housing 23 integrally connects the first compressor housing 21 and the first turbine housing 22. As shown in FIG. 1, the first turbocharger 7 is provided on the rear side of the engine 1 so that the first turbocharger turbine shaft 7c is substantially in parallel to the crankshaft of the engine 1.

The second turbocharger 8 comprises a second turbocharger compressor 8a, a second turbocharger turbine 8b, a second turbocharger turbine shaft 8c which synchronously-rotatably connects the second turbocharger compressor 8a and the second turbocharger turbine 8b, a second compressor housing 31 which covers an outer periphery of the second turbocharger compressor 8a, a second turbine housing 32 which covers an outer periphery of the second turbocharger turbine 8b, a second center housing 33 (shaft bearing portion) which rotatably supports the second turbocharger turbine shaft 8a and covers an outer periphery of the second turbocharger turbine shaft 8c, and so on. The second center housing 33 integrally connects the second compressor housing 31 and the second turbine housing 32. As shown in FIG. 1, the second turbocharger 8 is provided above the first turbocharger 7 and on the rear side of the engine 1 so that the second turbocharger turbine shaft 8c is substantially in parallel to the crankshaft of the engine 1.

As shown in FIGS. 4 and 9, an intake flow passage 14 which extends from the air cleaner 6 is connected to an outlet portion of the second turbocharger compressor 8a. An outlet portion of the second turbocharger compressor 8a and an inlet portion of the first turbocharger compressor 7a are connected via a compressor connection passage 15. An intake supply passage 16 to supply the intake air to the intake manifold 10 branches from a midway of the compressor connection passage 15 via the intercooler 9. An intake cut valve 17 is arranged inside the intake supply passage 16. The intake cut valve 17 is comprised of a swing valve, which is driven by an actuator 17a. A compressor downstream passage 18 is connected to the outlet portion of the first turbocharger compressor 7a. The compressor downstream passage 18 is connected to the intake supply passage 16 at a position downstream of the intake cut valve 17.

As shown in FIG. 4, an intake passage unit 49 is comprised of the first compressor housing 21, the second compressor housing 31, the compressor connection passage 15, part of the intake supply passage 16, and part of the compressor downstream passage 18. The intake passage unit 49 is made from metal, such as aluminum alloy, through casting. Herein, any thermal treatment after the casting may be omitted at need.

As shown in FIGS. 1 through 3 and 9, the exhaust system of the engine 1 comprises an exhaust manifold 11 which receives the exhaust gas from the exhaust ports 3b, the first turbocharger turbine 7b of the first turbocharger 7 driven by the exhaust energy, the second turbocharger turbine 8b of the second turbocharger 8 driven by the exhaust energy, an exhaust-gas purification device 12, an EGR pipe 13 to recirculate part of the exhaust gas into the intake manifold 10, and so on. The exhaust manifold 11 is configured to collect the exhaust ports 3b inside the cylinder head 3, and a flange 11a to connect the first turbocharger 7 is formed at a downstream end of the exhaust manifold 11.

The first turbocharger 7 and the second turbocharger 8 are arranged vertically so that the flange 11a is disposed between the engine 1 and these turbochargers 7, 8, and the outlet portion of the first turbocharger turbine 7b and the outlet portion of the second turbocharger turbine 8b are arranged on the right side in the direction of the crankshaft of the engine 1. The first turbocharger 7 is arranged on the left side of an upper portion of the cylinder block 2 and below the flange 11a. The second turbocharger 8 is arranged on the left side of the cylinder head cover 4 and above the flange 11a. The first turbocharger 7 and the second turbocharger 8 are fixed via bolts to an attachment portion 3g projecting from a rear side wall of the cylinder head 3 (see FIGS. 13, 15 and 16).

As shown in FIGS. 4 and 9, in the exhaust system of the engine 1 are provided a connection passage 41 which connects the outlet portion of the first turbocharger turbine 7b and the inlet portion of the second turbocharger turbine 8b, an induction passage 42 which guides the exhaust gas through the flange 11a of the exhaust manifold 11 to the inlet portion of the first turbocharger turbine 7b, a first bypass passage 43 which connects the induction passage 42 and the connection passage 41, a regulating valve 44 (control valve) which opens or closes the first bypass passage 43, and so on. The regulating valve 44 is comprised of a butterfly valve and driven by an actuator 44a.

Figure 5:
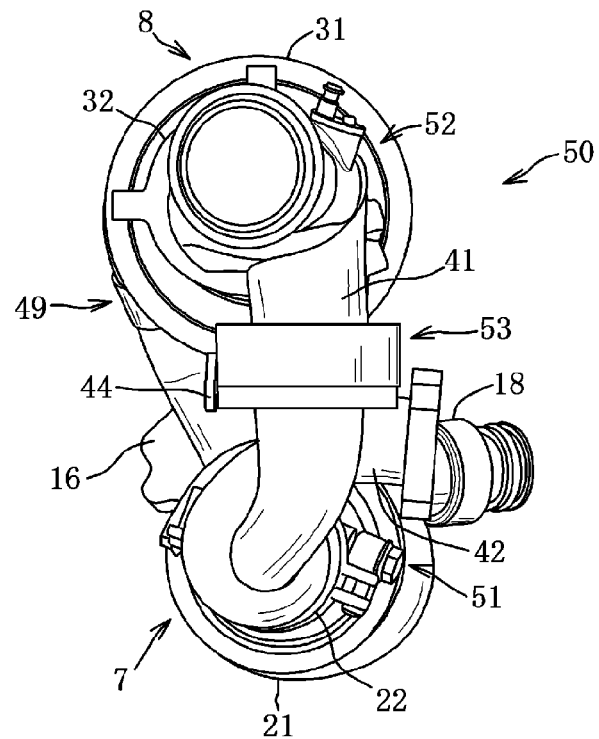
FIG. 5 is a side view of the intake passage unit and the exhaust passage unit, when viewed from a vehicle right.
Figure 6:
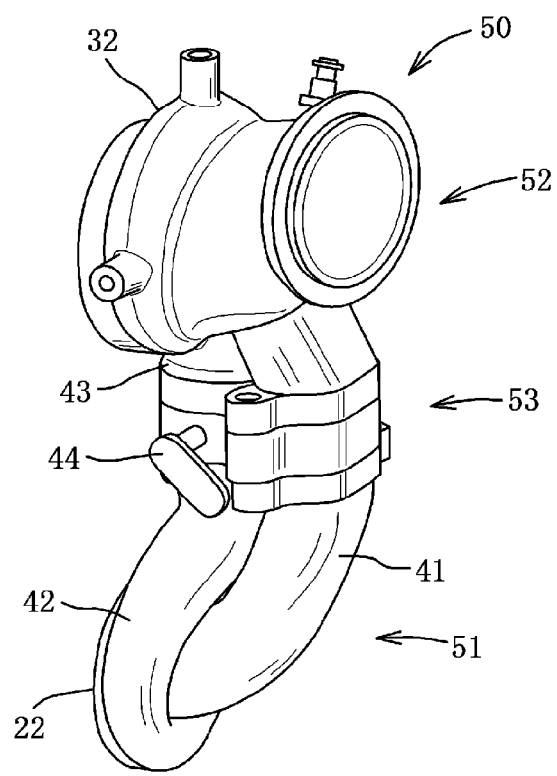
FIG. 6 is a perspective view of the exhaust passage unit.

As shown in FIGS. 5 and 6, the connection passage 41 extends almost straight from the outlet portion (axial-center position) of the first turbocharger turbine 7b toward the second turbocharger 8 (upward) in the axial direction of the turbine shafts 7c, 8c, and then connects to an outer peripheral portion of the second turbocharger turbine 8b in a tangential direction. Thereby, the outlet portion of the first turbocharger turbine 7b and the inlet portion of the second turbocharger turbine 8b can be connected via the shorter passage, so that the passage resistance of the exhaust gas can be decreased and also the radiation of the heat energy of the exhaust gas can be restrained properly.

Figure 7:
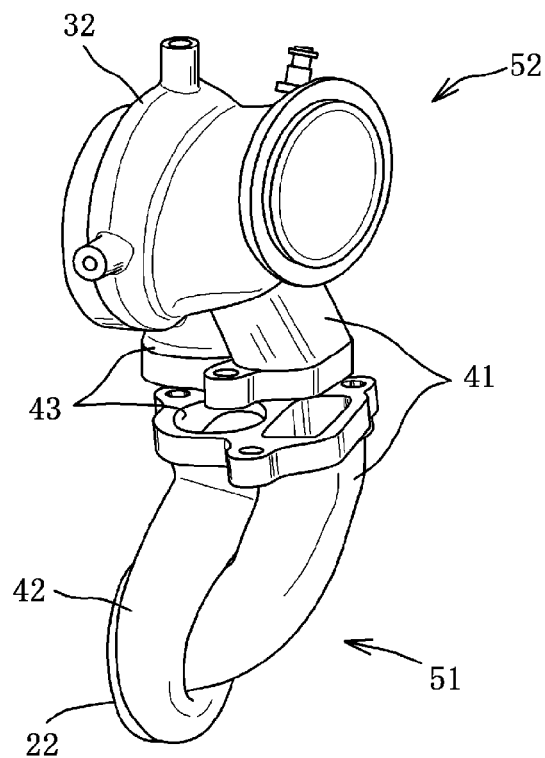
FIG. 7 is a perspective view of a first unit portion and a second unit portion.
Figure 8:
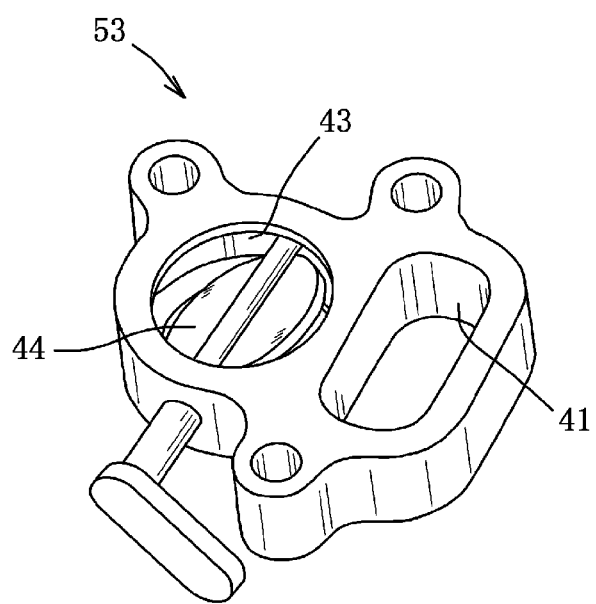
FIG. 8 is a perspective view of a middle member.

As shown in FIGS. 4 and 6, the connection passage 41 and the first bypass passage 43 are arranged nearby and integrally along the axial direction of the turbine shafts 7c, 8c. As shown in FIGS. 7 and 8, the section of part of the connection passage 41 on the side of the second turbocharger turbine 8 is of a flat shape, and the long axis of this section is substantially perpendicular to the second turbocharger turbine shaft 8c. The sectional shape of the connection passage 41 is configured so that the short axis of part of that located near the inlet portion of the second turbocharger turbine 8b is shorter than that of part of that located near the outlet port of the first turbocharger turbine 7b, whereas the long axis of part of that located near the inlet portion of the second turbocharger turbine 8b is longer than that of part of that located near the outlet port of the first turbocharger turbine 7b. Accordingly, the passage resistance of the exhaust gas can be decreased, so that the exhaust gas can be supplied to the second turbocharger turbine 8b without reducing the kinetic energy of the exhaust gas. The first bypass passage 43 is substantially of a circular shape.

As shown in FIGS. 4 through 6, an exhaust passage unit 50 is comprised of the first turbine housing 22, the second turbine housing 32, the connection passage 41, the first bypass passage 43, and the induction passage 42 of the first turbocharger turbine 23. The exhaust passage unit 50 includes a first unit portion 51 on the side of the first turbocharger 7, a second unit portion 52 on the side of the second turbocharger 8, and a middle member 53 provided at a connection portion of the first unit portion 51 to the second unit portion 52. The exhaust passage unit 50 is made from metal having a high heat and oxidation resistance, such as Si—Mo—Cr based Fe, through casting.

As shown in FIGS. 4 through 7, at the first unit portion 51 are integrally formed the first turbine housing 22, part of the connection passage 41 to supply the exhaust gas from the engine 1 to the second turbocharger turbine 8b via the first turbocharger turbine 7b, the induction passage 42 to supply the exhaust gas from the engine 1 to the first turbocharger turbine 7b, and part of the first bypass passage 43 to supply the exhaust gas from the engine 1 to the second turbocharger turbine 8b. As shown in FIG. 4, a flange portion 51a which is equipped with four bolt holes is formed at the front side of the first unit portion 51, and the intake passage unit 49 and the exhaust passage unit 50 are attached to the attachment portion 3g of the cylinder head 3 via this flange portion 51a with bolts.

At the second unit portion 52 are integrally formed the second turbine housing 32, part of the connection passage 41 to supply the exhaust gas from the engine 1 to the second turbocharger turbine 8b via the first turbocharger turbine 7b, and part of the first bypass passage 43 to supply the exhaust gas from the engine 1 to the second turbocharger turbine 8b.

As shown in FIG. 8, the regulating valve 44 is rotatably supported at the middle member 53 provided at the connection portion of the first and second unit portions 51, 52, and the part of the first bypass passage 43 and the part of the connection passage 41 are formed. Three bolt holes are formed respectively at an outer peripheral portion of the middle member 53, the first unit portion 51, and the second unit portion 52. These members 51, 52, 53 are fixed together by fastening three bolts passing into three bolt holes, thereby constituting the exhaust passage unit 50. At part of an inner peripheral portion of the first bypass passage 43 is formed a seat portion for the regulating valve 44. The regulating valve 44 is adjustable linearly from its full closing state to a specified opening angle, e.g., 80 degrees, so that the flow amount of exhaust gas passing through the first bypass passage 43 can be adjusted properly by the actuator 44a.

As shown in FIGS. 1 through 3 and 9, a turbine downstream passage 45 extends to the right from the outlet portion of the second turbocharger turbine 8b and connects to the exhaust-gas purification device 12. Between the inlet portion of the second turbocharger turbine 8b and the turbine downstream passage 45 is formed a second bypass passage 46. A waste gate valve 47 is arranged inside the second bypass passage 46. This waste gate valve 47 is comprised of a swing valve and driven by an actuator 47a.

The exhaust-gas purification device 12 is positioned vertically on the right of the rear side wall of the engine 1, i.e., the first turbocharger 7 and the second turbocharger 8, so that its inlet is located substantially at the level of the outlet portion of the second turbocharger turbine 8b, whereas its outlet is located below the first turbocharger 7. The exhaust-gas purification device 12 stores an oxidizing catalyst 12a and the DPF (Diesel Particulate Filter) 12b therein, and has an insulator covering it. The exhaust-gas purification device 12 is supported respectively at an upper bracket 19 which is fixed to the cylinder head cover 4 via its upper end portion and at a lower bracket 20 which is fixed to the cylinder block 2 via its lower end portion. Herein, the DPF 12b may be comprised of not only a filter to trap (remove) soot, but a filter with catalytic agent.

Figures 10, 11:
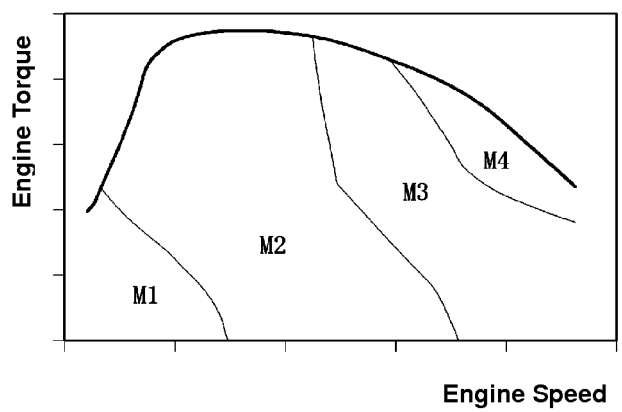
FIG. 10 is a control map for selection of driving modes.
FIG. 11 is a chart showing opening or closing states of valves in respective driving modes.

The control of the first and second turbochargers 7, 8 will be described referring to FIGS. 9 through 11. As shown by a control map in FIG. 10, the engine 1 is controlled in accordance with vehicle traveling state with five driving modes M0-M4; the start mode M0, the low engine-speed mode M1, the middle engine-speed mode M2, the middle high engine-speed mode M3 and the high engine-speed mode M4. A control part (not illustrated) of the engine 1 determines the driving modes M0-M4 based on detection values of some onboard sensors, and controls the intake cut valve 17, the regulating valve 44, and the waste gate valve 47 based on the chart shown in FIG. 11.

In the start mode M0 at the engine start, the intake cut valve 17 is closed, and the regulating valve 44 and the waste gate valve 47 are open. As shown in FIG. 9, the exhaust gas of the engine 1 flows down through the exhaust ports 3b and the exhaust manifold 11, then into the induction passage 42. Herein, since the regulating valve 44 is open, the exhaust gas flows down through the first bypass passage 43, bypassing the first turbocharger turbine 7b. Then, the exhaust gas flows into the exhaust-gas purification device 12, bypassing the second turbocharger turbine 8b, because the waste gate valve 47 is open. Accordingly, the exhaust gas having the less kinetic-energy loss and the high temperature can be guided into the exhaust-gas purification device 12. Herein, since the first turbocharger compressor 7a and the second turbocharger compressor 8a do not operate, the intake air is not supercharged.

In the low engine-speed mode M1, the intake cut valve 17, the regulating valve 44 and the waste gate valve 47 are closed. Since the regulating valve 44 is closed, the exhaust gas of the engine 1 drives the first turbocharger turbine 7b and the second turbocharger turbine 8b and then flows into the exhaust-gas purification device 12. The intake air supercharged by the first turbocharger compressor 7a and the second turbocharger compressor 7b is supplied to the intake ports 3a. Accordingly, the supercharging effect can be properly obtained even with the kinetic energy of the exhaust gas which may be relatively small at the low engine-speed.

In the middle engine-speed mode M2, the intake cut valve 17 and the waste gate valve 47 are closed, and the regulating valve 44 is adjusted. The opening of the regulating valve 44 is adjusted so as to become larger when the engine speed is higher or the engine torque is greater. Since the opening angle of the regulating valve 44 is controlled in according with the driving state, part of the exhaust gas drives the first turbocharger turbine 7b and the second turbocharger turbine 8b, and the rest of the exhaust gas flows into the exhaust-gas purification device 12, bypassing the first turbocharger turbine 7b and the second turbocharger turbine 8b. The intake air supercharged by the first turbocharger compressor 7a and the second turbocharger compressor 7b is supplied to the intake ports 3a. Accordingly, both the supercharging efficiency of the first turbocharger compressor 7a and the decrease of exhaust resistance can be improved.

In the middle high engine-speed mode M3, the intake cut valve 17 and the regulating valve 44 are open, and the waste gate valve 47 is closed. The exhaust gas of the engine 1 bypasses the first turbocharger turbine 7b, passes through the first bypass passage 43 and drives the second turbocharger turbine 8b, then flows into the exhaust-gas purification device 12. The intake air supercharged by the second turbocharger compressor 8a is supplied to the intake ports 3a.

In the high engine-speed mode M4, the intake cut valve 17 and the regulating valve 44 are open, and the waste gate valve 47 is adjusted. The waste gate valve 47 is controlled to be open when the engine speed is a specified speed or higher and the engine torque is a specified torque or greater. Since the waste gate valve 47 is adjusted in accordance with the driving state, part of the exhaust gas bypassing the first turbocharger turbine 7b drives the second turbocharger turbine 8b, and the rest of the exhaust gas flows into the exhaust-gas purification device 12, bypassing the second turbocharger turbine 8b. The intake air supercharged by the second turbocharger compressor 8b is supplied to the intake ports 3a. Accordingly, the proper supercharging efficiency of the second turbocharger compressor 8a can be secured, and the intake and exhaust resistance can be decreased properly.

Hereafter, the lubrication device of the present embodiment will be described referring to FIGS. 1, 12 through 14. As shown in FIG. 13, an oil gallery 3c extending laterally is formed inside the cylinder head 3. The lubricating oil of the engine 1 is supplied by an oil pump (not illustrated) provided at the cylinder block 2 to respective lubrication portions via oil passages. The lubricating oil which is supplied from the oil pump to the cylinder head 3 is supplied to respective bearing portions for camshafts from the oil gallery.

Inside a first center housing 23 of the first turbocharger 7 is formed an oil reservoir (not illustrated) to reserve the lubricating oil between a first turbocharger turbine shaft 7c and the bearing portions. Similarly to the first center housing 23, another oil reservoir (not illustrated) to reserve the lubricating oil between a second turbocharger turbine shaft 8c and the bearing portions is formed inside a second center housing 33 of the second turbocharger 8. The lubricating oil for the first and second turbocharger turbine shaft is supplied to the first and second center housings 23, 33 from the cylinder head 3 via an oil distributor 60. Then, the lubricating oil is returned to an oil return portion 2a which is formed at a middle left position of a rear side wall of the cylinder block 2.

The oil distributor 60 is located at a left position of a rear upper and left end portion of the cylinder block 2. The oil distributor 60 is connected by an oil take-out portion 3d connecting to a left end portion of the oil gallery 3c at the cylinder head 3 and an oil supply passage 61. The metal-made oil supply passage 61 extends downward from the oil take-out portion 3d, then bends rearward and to the left, and connects to the oil distributor 60. Thus, the number of the oil take-out portion 3d as the engine-side connection portion can be less than that of the oil supply passages of the first and second turbochargers 7, 8.

The first center housing 23 has a first supply passage 24 to guide the lubricating oil from the oil distributor 60, a first return passage 25 to exhaust the lubricating oil, and so on. The second center housing 33 has a second supply passage 34 to guide the lubricating oil from the oil distributor 60, a second return passage 35 to exhaust the lubricating oil, and so on. As shown in FIG. 1, the first and second return passages 25, 35 are located on the left side of the exhaust-gas purification device 12.

Figure 12:
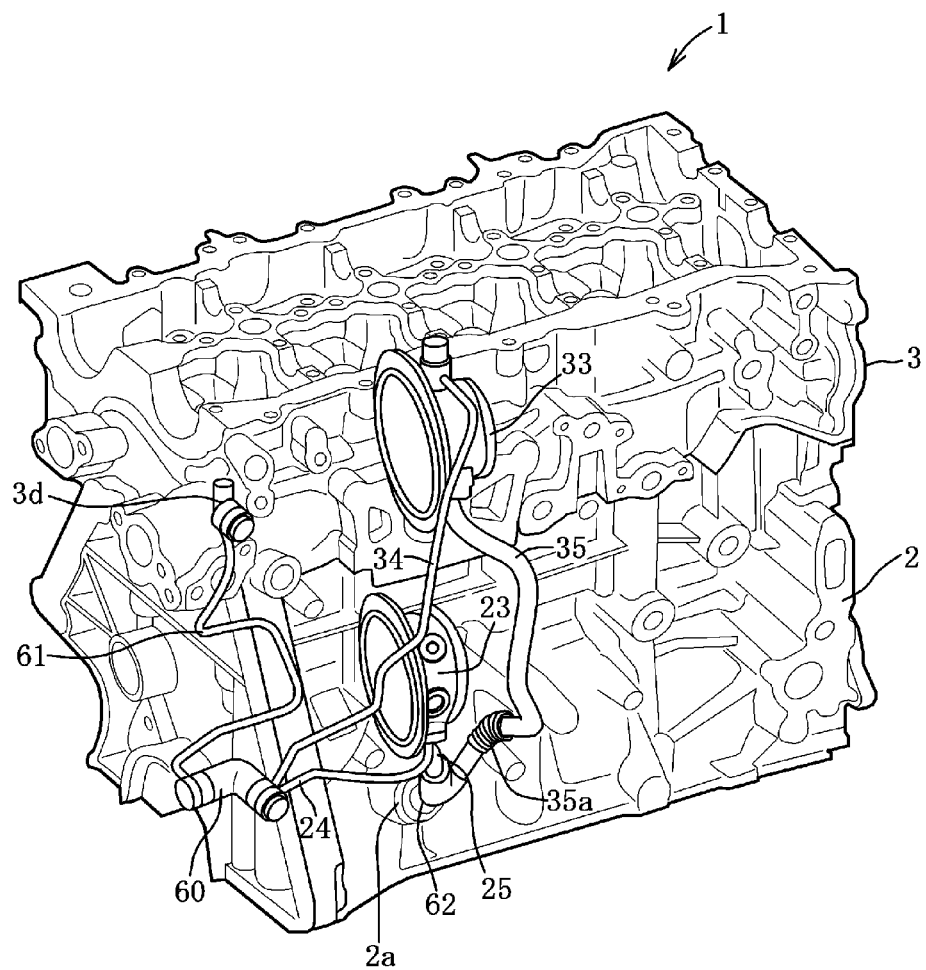
FIG. 12 is a perspective view showing a lubricating-oil passage according to the present embodiment.
Figure 13:
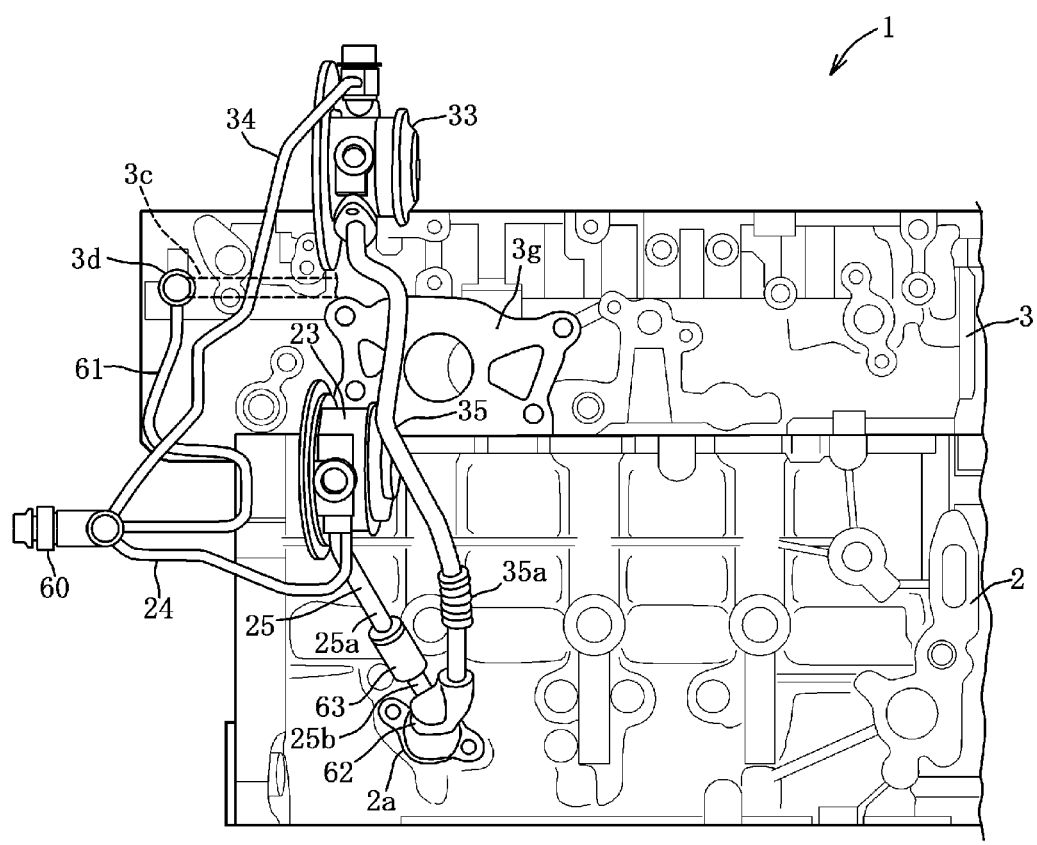
FIG. 13 is an elevational view showing the lubricating-oil passage according to the present embodiment.
Figure 14:
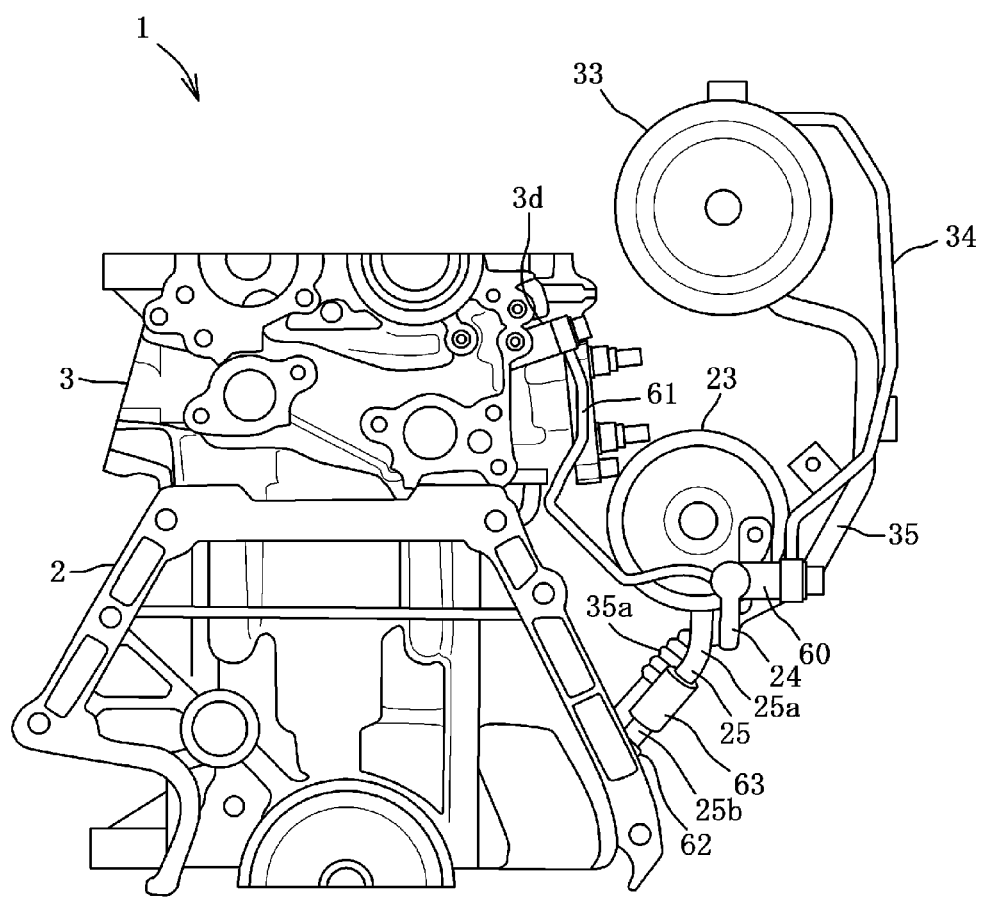
FIG. 14 is a left side view showing the lubricating-oil passage.
Figure 15:
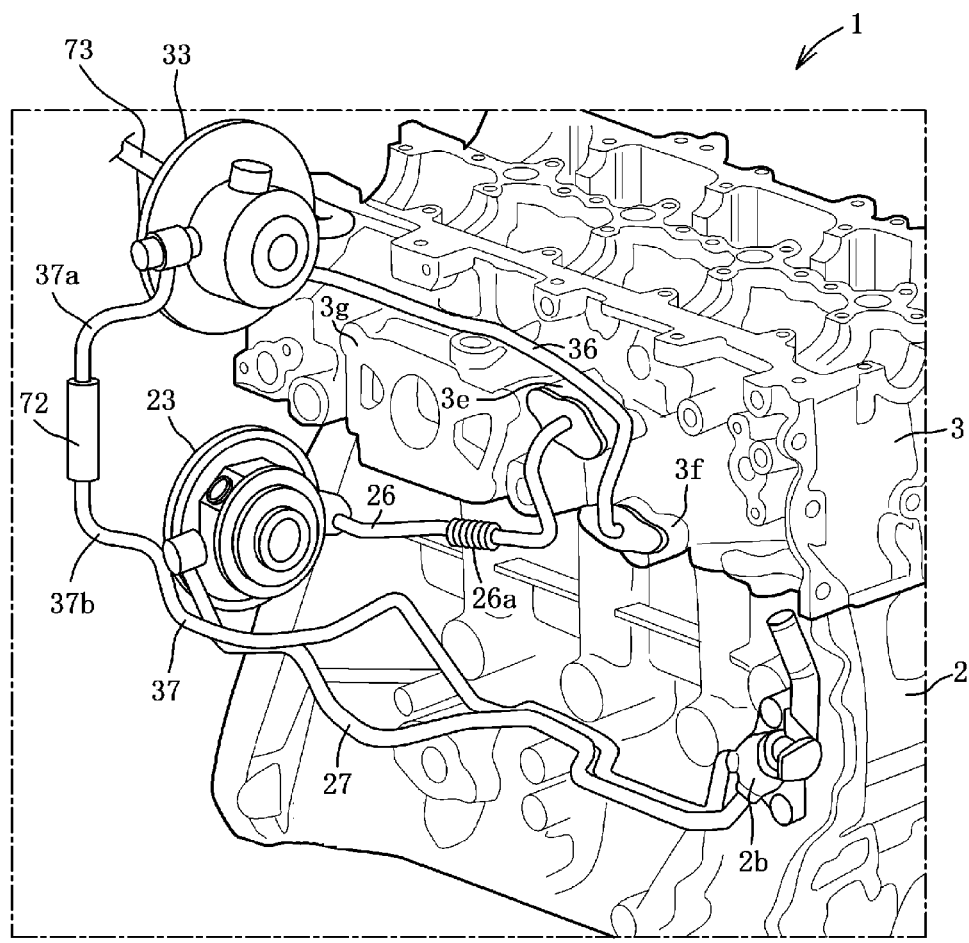
FIG. 15 is a perspective view showing a cooling-water passage according to the present embodiment.
Figure 16:
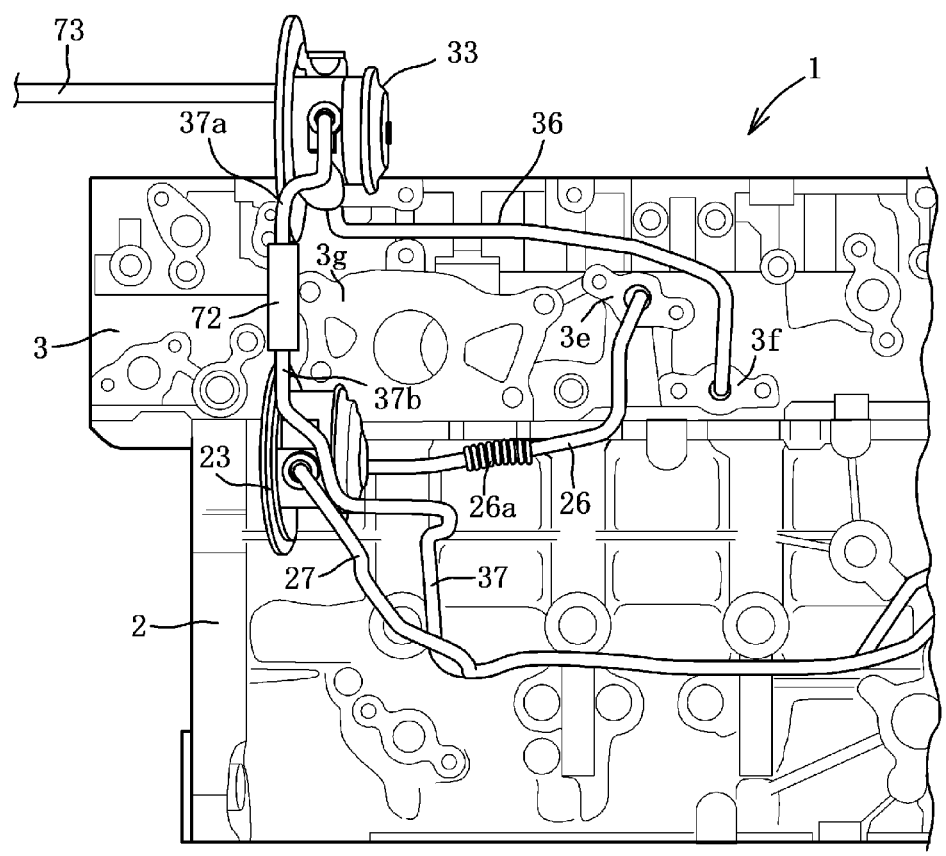
FIG. 16 is an elevational view showing the cooling-water passage.
Figure 17:
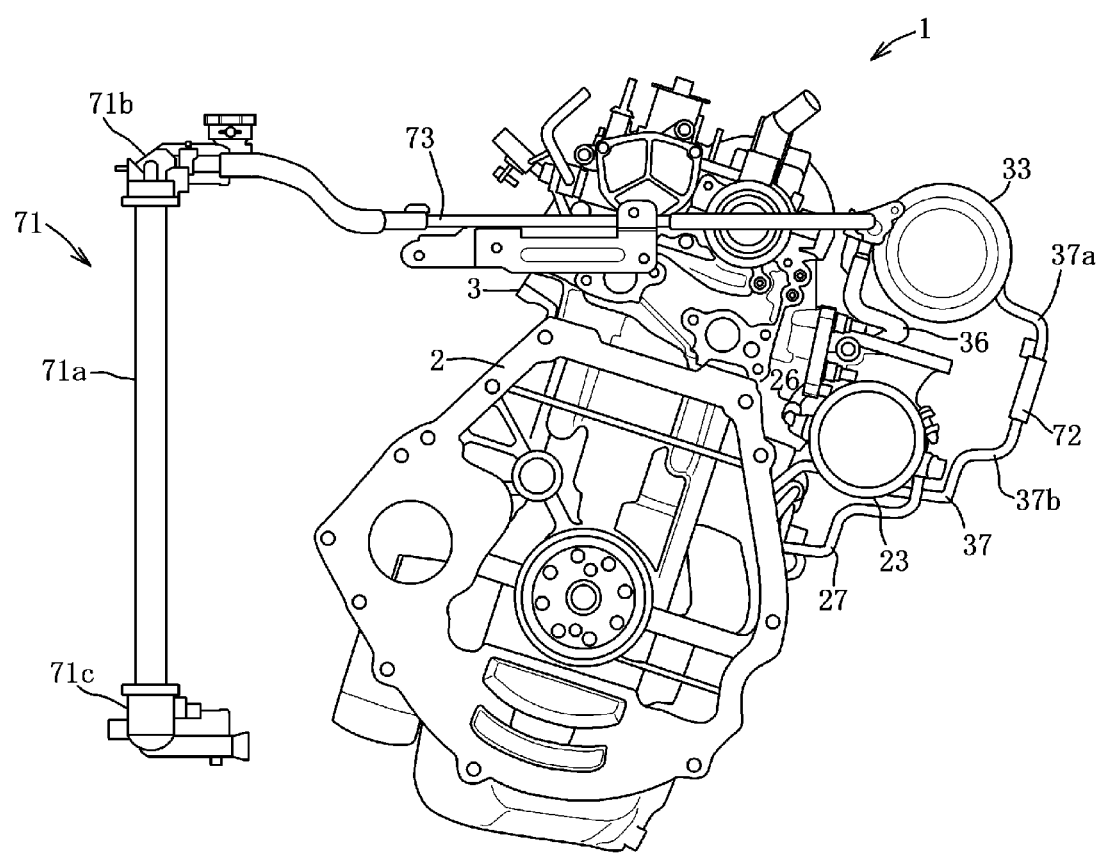
FIG. 17 is a left side view showing the cooling-water passage.

As shown in FIGS. 12 and 13, the metal-pipe-made first supply passage 24 extends from the oil distributor 60 to the right, toward the first turbocharger turbine shaft 7c, and bends upward, then connects to a lower face of the first center housing 23. The metal-pipe-made first return passage 25 has a larger diameter than the first supply passage 24, and comprises a first upstream return passage 25a on the side of the first center housing 23 and a first downstream return passage 25b on the side of the oil return portion 2a.

The first upstream return passage 25a connects to the lower face of the first center housing 23 at its upper end portion, and extends obliquely downward and forward. The first downstream return passage 25b joins the second return passage 35 at a junction 62 which will be described specifically. A lower end portion of the first upstream return passage 25a and an upper end portion of the first downstream return passage 25b are connected via a flexible hose 63 which is made from heat-resisting synthetic rubber. Accordingly, even if there occurs any positional error between the lower end portion of the first upstream return passage 25a and the upper end portion of the first downstream return passage 25b, the flexible hose 63 may absorb such positional error. Further, since the flexible hose 63 can be shortened by shortening of the first return passage 25, the surface area exposed to the high temperature can be minimized Accordingly, the vibration move of the first turbocharger 7 relative to the engine 1 can be absorbed, restraining the heat damage of the flexible hose 63, and the positional error of the first and second turbochargers 7, 8 can be absorbed.

The metal-pipe-made second supply passage 34 extends from the oil distributor 60 to the right, toward the second turbocharger turbine shaft 8c, and bends upward and then forward, then connects to an upper face of the second center housing 33. The metal-pipe-made second return passage 35 has a larger diameter than the second supply passage 34, and is arranged between the first return passage 25 and the exhaust-gas purification device 12. The second return passage 35 extends downward from the lower face of the second center housing 33, and then connects to the oil return portion 2a at its lower end portion. A bellows-shaped vibration absorption portion 35a is provided at a lower-side portion of the second return passage 35. Accordingly, even if the entire of the second return passage 35 is made from heat-resisting metal, the bellows-shaped vibration absorption portion 35a can absorb the vibration move which may be caused by difference in vibration characteristics between the second turbocharger and the engine.

The metal-made junction 62 where the first downstream return passage 25b joins is provided at the lower end portion of the second return passage 35, and connects to the oil return portion 2a at its lower end portion. The length of part of the second return passage 35 from the second center housing 33 to the junction 62 is longer than that of the first return passage 25 from the first center housing 23 to the junction 62. Herein, the passage length of the first return passage 25 is the total length of the passages of the first upstream return passage 25a, the first downstream passage 25b, and the flexible hose 63. Thereby, the number of the oil return portion 2a can be less than the number of the first and second return passages 25, 35 of the first and second turbochargers 7, 8. Accordingly, the first and second return passages 25, 35 can be connected to the engine's side wall by using a smaller layout space, thereby increasing the layout flexibility around the engine 1. Further, since only the second return passage 35 is connected to the engine's side wall, the positional error of the first turbocharger 7 relative to the engine 1 does not influence the connection of the second return passage 35, so that the assembly error of the second return passage 35 can be minimized.

Figure 18:
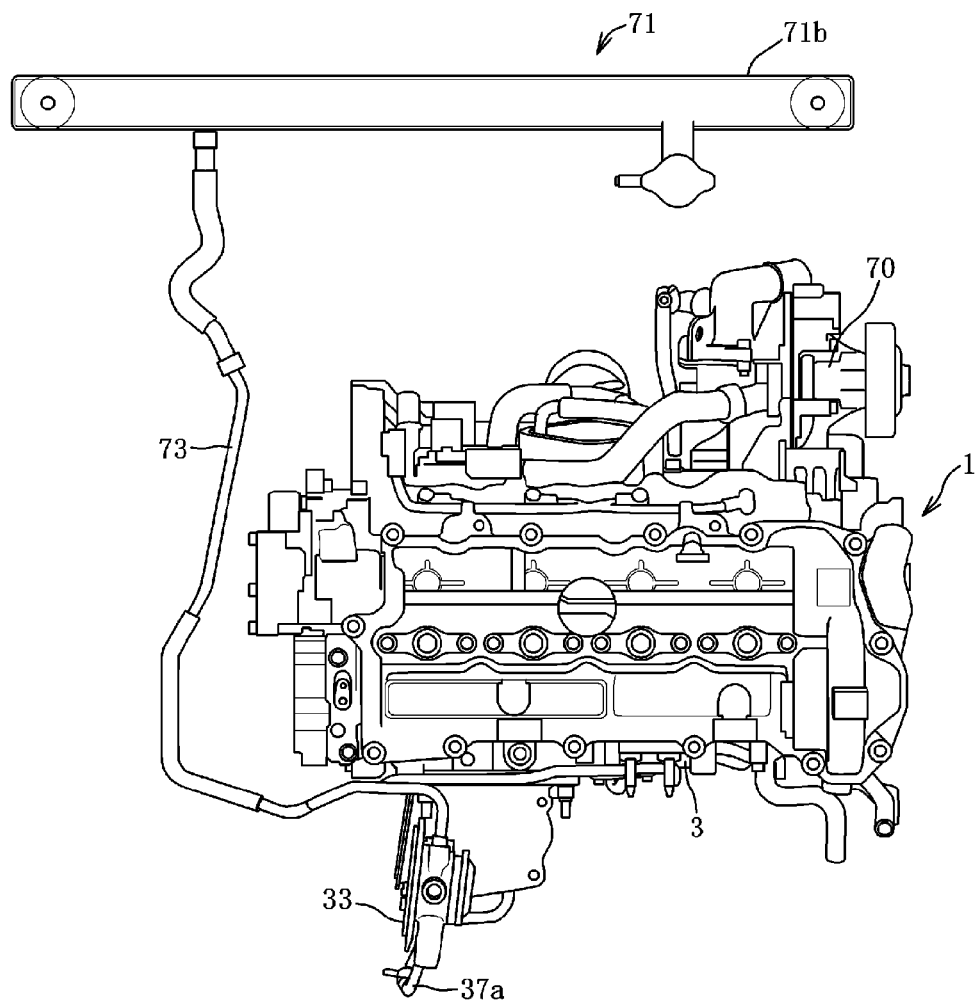
FIG. 18 is a plan view of the cooling-water passage, when viewed from above.

Next, a cooling device of the present embodiment will be described referring to FIGS. 15 through 18. As shown in FIG. 18, the cooling water of the engine 1 is supplied by a water pump 70 which is provided at a front side wall of the cylinder block 2 to potions to be cooled via cooling-water passages. The cooling water supplied from the water pump 70 to the cylinder head 3 via the cylinder block 2 circulates into water jackets (not illustrated) formed inside the cylinder head 3 and cools the portions to be cooled. The heated cooling water is supplied to a radiator 71 (a cooling-water storage portion) arranged at the front-side position of the engine 1, where the cooling water is cooled so as to decrease the water temperature through the heat exchanging with the vehicle's traveling air. The cooled water is returned to the water pump 70.

The radiator 71 comprises a core 71a having many heat-radiation fins, an upper tank 71b provided above the core 71a, a lower tank 71c provided below the core 71a, and so on. The cylinder head 3 and the upper tank 71b are connected by a suction passage (not illustrated), and the lower tank 71c and a cooling-water induction portion (not illustrated) on the suction side of the water pump 70 are connected via a delivery passage (not illustrated). The upper tank 71b is positioned above the second center housing 33 of the second turbocharger 8. A thermostat (not illustrated) to control the flow of the cooling water in accordance with the water temperature is provided at the cooling-water induction portion.

Inside the first center housing 23 of the first turbocharger 7 is formed a cooling-water reservoir (not illustrated) to reserve the cooling water at the bearing portion of the first turbocharger turbine shaft 7c. Similarly to the first center housing 23, another cooling-water reservoir (not illustrated) to reserve the cooling water at the bearing portion of the second turbocharger turbine shaft 8c is formed inside the second center housing 33 of the second turbocharger 8. The cooling water for the first and second turbocharger turbine shaft is supplied to the first and second center housings 23, 33 from the cylinder head 3, and then returned to a cooling-water return portion 2b which is formed at a middle right position of the rear side wall of the cylinder block 2. A heater return pipe is connected to the cooling-water return portion 2b, and the cooling-water for the first and second turbocharger turbine shaft joins the cooling water retuned from a heater. The cooling-water return portion 2b is connected to the cooling-water induction portion on the suction side of the water pump 70.

A first supply passage 26 to supply the cooling water from the cylinder head 3, a first return passage 27 to discharge the cooling water, and so on are provided at the first center housing 23. At the second center housing 33 are provided a second supply passage 36 to supply the cooling water from the cylinder head 3, a second return passage 37 to discharge the cooling water, a vapor return passage 73, and so on.

The metal-pipe-made first supply passage 26 couples a middle portion of a front face of the first center housing 23 which faces the rear side wall of the cylinder block 2 and a cooling-water connection portion 3e (an engine-body-side connection portion) which connects to the water jacket of the cylinder head 3. The cooling-water connection portion 3e is provided at a central portion of the engine 1 in the crankshaft direction and at the middle position of the cylinder head 3. The first supply passage 26 extends downward from the cooling-water connection portion 3e, and then rearward toward the first center housing 23. Accordingly, when the engine 1 stops after the engine operation at the engine high load, the vapor generating at the first center housing 23 is exhausted to the water jacket of the cylinder head 3 via the first supply passage 26, so that the cooling water is newly supplied into the first center housing 23.

A bellows-shaped vibration absorption portion 26a is provided at the first supply passage 26. Thereby, the assembly error of the first turbocharger 7 relative to the engine 1 can be absorbed, and the vibration move which may be caused by difference in vibration characteristics between the first turbocharger 7 and the engine 1 can be absorbed.

The metal-pipe-made first return passage 27 couples a middle portion of a rear face of the first center housing 23 to the cooling-water return portion 2b. The first return passage 27 extends downward from the rear face of the first center housing 23 toward the cooling-water return portion 2b. Thereby, the layout flexibility of the first return passage 27 can be increased, and the vapor from the first turbocharger 7 can be securely released to the vehicle-body side.

The metal-pipe-made second supply passage 36 couples a middle portion of a front face of the second center housing 33 which faces the rear side wall of the cylinder head cover 4 to a cooling-water connection portion 3f (an engine-body-side connection portion) which connects to the water jacket of the cylinder head 3. The cooling-water connection portion 3f is provided on the right side of the cooling-water connection portion 3e and below the connection portion 3e. The second supply passage 36 extends upward from the cooling-water connection portion 3f, and then rearward toward the second center housing 33.

The metal-pipe-made second return passage 37 couples a middle portion of a rear face of the second center housing 33 to the cooling-water return portion 2b. The second return passage 37 comprises a second upstream return passage 37a on the side of the second center housing 33 and a second downstream return passage 37b on the side of the cooling-water return portion 2b. The second upstream return passage 37a connects to the middle portion of the rear face of the second center housing 23 at its upper end portion, and extends downward and rearward in a crank shape. The second downstream return passage 37b extends downward toward the cooling-water return portion 2b. A lower end portion of the second upstream return passage 37a and an upper end portion of the second downstream return passage 37b are connected via a flexible hose 72 which is made from heat-resisting synthetic resin and extends vertically. Thereby, the assembly error of the second turbocharger 8 relative to the engine 1 can be absorbed, and the vibration move which may be caused by difference in vibration characteristics between the second turbocharger 8 and the engine 1 can be absorbed.

The vapor return passage 73 couples an upper portion of the cooling-water reservoir of the second turbocharger turbine shaft 8c to a suction-side portion of the upper tank 71b. A connection position between the vapor return passage 73 and the second center housing 33 is located above a connection position between the second center housing 33 and the second supply passage 36 or a connection position between the second center housing 33 and the second return passage 37. Accordingly, when the engine 1 stops after the engine operation at the engine high load, the vapor generating at the second center housing 33 is discharged to the suction-side portion of the upper tank 71b via the vapor return passage 73, so that the cooling water is newly supplied into the second center housing 33 via the second supply passage 36.

Hereafter, the operation and effect of the cooling device of the turbocharger of the engine 1 for a vehicle according to the present embodiment will be described. In the present cooling device of the turbocharger of the engine 1 for a vehicle, in which the first turbocharger 7 and the second turbocharger 8 are provided at the one-side wall of the engine 1, the second turbocharger 8 being located above the level of the first turbocharger 7, there are provided the first and second water supply passages 26, 36 to supply the cooling water from the engine 1 to the first and second center housings 23, 33 of the first and second turbochargers 7, 8, the first and second return passages 27, 37 to return the cooling water from the first and second turbochargers 7, 8 to the engine 1, the connection portions of the first and second water supply passages 26, 36 to the engine body of the engine 1, the connection portion of the first water supply passage 26 being located above the level of the connection portion of the second water supply passage 36, and the vapor releasing passage 73 provided between the second turbocharger 8 and the upper tank 71b which is provided on the outside of the engine body at the position located above the connection portion of the second return passage 37 of the second turbocharger 8.

According to the cooling device of the turbocharger of the engine 1 for a vehicle of the present invention, since the vapor from the first turbocharger 7 is released to the cylinder head 3 and the vapor from the second turbocharger 8 is released to the upper tank 71b provided on the outside of the engine body, the vapor flowing out from one of the turbochargers does not obstruct the vapor flowing out from the other of the turbochargers, so that the vapor releasing function from the first and second turbochargers 7, 8 can be improved. Moreover, the level difference between the first turbocharger 7 and the cooling-water connection portion 3e and the level difference between the second turbocharger 8 and the upper tank 71b can be secured regardless of the arrangement positions of the first and second turbochargers 7, 8, so that the vapor releasing function can be improved. Since any vapor releasing passage connecting the first turbocharger 7 and the upper tank 71b provided on the outside of the engine body can be omitted, the layout flexibility around the engine 1 can be increased.

Since the first and second return passages 27, 37 are provided at positions located below the first and second turbochargers 7, 8, as well as the layout flexibility of the first and second return passages 27, 37 can be increased, the vapor from the first turbocharger 7 can be released securely to the cylinder head 3, and the vapor from the second turbocharger 8 can be released to the upper tank 71b provided on the outside of the engine body. Since the flexible hose 72 is provided at the second return passage 37, the assembly error and the vibration move of the second turbocharger 8 to the engine 1 can be absorbed easily.

Since the first and second return passages 27, 37 are connected to the suction-side portion of the water pump 70 provided at the engine body of the engine 1, the cooling water can be compulsorily circulated with a suction force of the water pump 70, so that the return function can be improved. Since the cooling-water storage portion is the upper tank 71b of the radiator 71, the level difference and pressure difference can be secured to the second turbocharger 8, so that the vapor releasing function can be improved.

Next, modifications of the above-described embodiment will be described.

While the example of the laterally-disposed diesel engine is described in the above-described embodiment, the present invention is applicable to any kind of engine or any disposition type of engine, for example, a reciprocating engine which is disposed longitudinally.

Further, while the above-described embodiment describes the turbocharger system comprising the lower small-volume first turbocharger and the upper large-volume second turbocharger which are arranged vertically, the present invention is applicable to a turbocharger system in which the small-volume first turbocharger is arranged upward and the large-volume second turbocharger is arranged downward. In this case, the small-volume first turbocharger and the cooling-water storage portion provided on the outside of the engine body may be connected via the vapor releasing passage.

As described above, the present invention should not be limited to the above-described embodiment, and any other modifications and improvements may be applied within the scope of a spirit of the present invention.

What is claimed is:

1. A cooling device of a turbocharger of an engine for a vehicle, in which a first turbocharger and a second turbocharger are provided at a one-side wall of the engine, the second turbocharger being located above the level of the first turbocharger, comprising:
    first and second water supply passages to supply cooling water from the engine to respective shaft bearing portions of the first and second turbochargers;
    first and second return passages to return the cooling water from the first and second turbochargers to the engine;
    respective connection portions of the first and second water supply passages to an engine body of the engine, the connection portion of the first water supply passage being located above the level of the connection portion of the second water supply passage; and
    a vapor releasing passage provided between the second turbocharger and a cooling-water storage portion which is provided on the outside of the engine body at a position located above the connection portion of the second return passage of the second turbocharger.

2. The cooling device of a turbocharger of an engine for a vehicle of claim 1, wherein said first and second return passages are provided at positions located below said first and second turbochargers.

3. The cooling device of a turbocharger of an engine for a vehicle of claim 2, wherein a flexible hose is provided at said second return passage.

4. The cooling device of a turbocharger of an engine for a vehicle of claim 2, wherein said first and second return passages are connected to a suction-side portion of a water pump provided at the engine body.

5. The cooling device of a turbocharger of an engine for a vehicle of claim 2, wherein said cooling-water storage portion is an upper tank of a radiator.

6. The cooling device of a turbocharger of an engine for a vehicle of claim 1, wherein a flexible hose is provided at said second return passage.

7. The cooling device of a turbocharger of an engine for a vehicle of claim 6, wherein said first and second return passages are connected to a suction-side portion of a water pump provided at the engine body.

8. The cooling device of a turbocharger of an engine for a vehicle of claim 6, wherein said cooling-water storage portion is an upper tank of a radiator.

9. The cooling device of a turbocharger of an engine for a vehicle of claim 1, wherein said first and second return passages are connected to a suction-side portion of a water pump provided at the engine body.

10. The cooling device of a turbocharger of an engine for a vehicle of claim 9, wherein said cooling-water storage portion is an upper tank of a radiator.

11. The cooling device of a turbocharger of an engine for a vehicle of claim 1, wherein said cooling-water storage portion is an upper tank of a radiator.

* * * * *